United States Patent [19]

Schnurbusch et al.

[11] 4,430,474
[45] Feb. 7, 1984

[54] STOVING ENAMEL CONTAINING BLOCKED ISOCYANATES

[75] Inventors: Horst Schnurbusch; Rainer Gras, both of Herne; Elmar Wolf, Recklinghausen, all of Fed. Rep. of Germany

[73] Assignee: Chemische Werke Huels AG, Marl, Fed. Rep. of Germany

[21] Appl. No.: 292,689

[22] Filed: Aug. 13, 1981

[30] Foreign Application Priority Data

Aug. 13, 1980 [DE] Fed. Rep. of Germany ....... 3030554

[51] Int. Cl.³ .............................................. C08L 67/02
[52] U.S. Cl. .................................... 524/590; 525/440
[58] Field of Search ......................... 525/440; 524/590

[56] References Cited

U.S. PATENT DOCUMENTS 3,099,642  7/1963  Holtschmidt et al. .............. 525/440
3,923,743 12/1975  Quiring et al. ....................... 525/440
3,931,117  1/1976  Leonard .............................. 525/440
4,151,152  4/1979  Schmitt et al. ...................... 525/440

FOREIGN PATENT DOCUMENTS 583363  9/1959  Canada ................................ 525/440

OTHER PUBLICATIONS

Saunders, J. H., and Frisch, K. C.; High Polymers, vol. XVI; Polyurethanes: Chemistry and Technology, Part I, Chemistry, Interscience, New York, 1962, pp. 91–94 and 113–115.

*Primary Examiner*—Paul R. Michl
*Assistant Examiner*—Alex H. Walker
*Attorney, Agent, or Firm*—Oblon, Fisher, Spivak, McClelland & Maier

[57] ABSTRACT

A stoving enamel comprising (a) 30–70% by weight of a mixture of a polymer containing hydroxyl groups having a hydroxyl number between 40 and 240 mg KOH/g with an isocyanurate-free derivative of isophorone diisocyanate containing uretidinedione groups and blocked isocyanate groups, (b) 0–3% by weight of a cross-linking catalyst, (c) 30–60% by weight of an organic solvent, (d) 0–65% by weight of a filler or pigment, (e) 0–5% by weight of a dye, and (f) optionally 0.1–3% by weight of leveling agents, gloss improvers, antioxidants, and/or stabilizers, has improved storage stability, reduced curing time and reduced liberation of blocking agent during cure.

5 Claims, No Drawings

STOVING ENAMEL CONTAINING BLOCKED ISOCYANATES of isophorone diisocyanate containing uretidinedione groups which are partially or completely blocked, and optionally have been chain extended with glycols, having the general formula

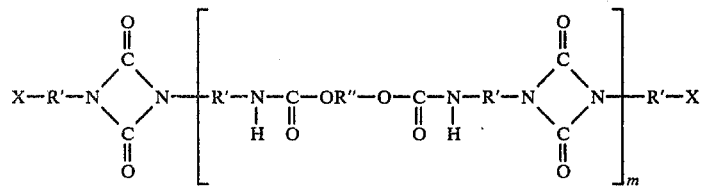

BACKGROUND OF THE INVENTION

1. Field of the Invention

This invention relates to stoving enamels and, more particularly, to stoving enamels containing blocked isocyanates.

2. Description of the Prior Art

In the production of mixtures of polyisocyanates and polyhydroxy compounds that can be stored at normal temperatures, it is known to use polyisocyanates whose reactive groups are protected by reaction with monofunctional compounds and which are generally designated as blocked, capped or masked polyisocyanates. Such products are described in Liebigs Annalen Vol. 562, p. 205-229. At elevated temperatures these compounds are cleaved into their original constituents, allowing the liberated isocyanate groups to react in turn with the polyhydroxy compounds present in the reaction mixture.

Such a single component stoving enamel system that is stable enough to store at room temperature consists typically of an ε-caprolactam-blocked adduct of 3-isocyanatomethyl-3,5,5-trimethylcyclohexyl isocyanate dissolved in a high boiling enamel solvent and a polyester containing hydroxyl groups based on predominantly aromatic dicarboxylic acids and a mixture of diols and triols. Such an enamel is described in German OS No. 23 46 818. The curing rate of such a system is, however, too slow for certain applications. It is possible by using catalysts such as tertiary amines or organic tin compounds to increase the curing rate considerably. However, such additives react with the capped polyisocyanates even at cold temperatures, and particularly in the presence of compounds that can react with isocyanates, so as to cause the monofunctional protective compound to split off even at normal temperatures and thereby make the mixture unstable.

Another disadvantage of this single component stoving enamel system described in German OS 23 46 818 is the high concentration of the blocking agent liberated during curing.

The recited disadvantages are largely eliminated by the present invention, i, e., curing time, curing temperature, and the amount of blocking agents split off are reduced.

SUMMARY OF THE INVENTION

The object of the invention is stoving enamels based on a mixture of polymers containing hydroxyl groups, blocked polyisocyanates and organic solvents as well as the conventional enamel additives comprising a. 40-70% by weight of a mixture of polymers containing hydroxyl groups having a hydroxyl number between 40 and 240 mg KOH/g, preferably between 60 and 150 mg KOH/g, and isocyanurate-free derivatives wherein:

X = —N=C=O or

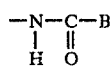

m = 0-6,

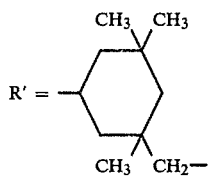

R'' = identical or different, optionally substituted alkylene, cycloalkyl, or aromatic radicals having 1-12 C-atoms,

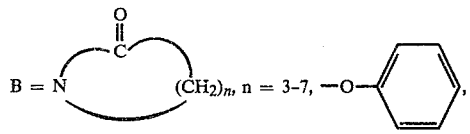

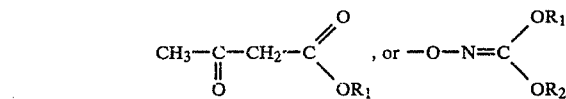

p1 wherein $R_1$ and $R_2$ are identical or different aliphatic hydrocarbon radicals having 1-4 C-atoms, or $R_1$ and $R_2$, taken together with the C-atom bound to the nitrogen atom via a double bond, form a cycloaliphatic hydrocarbon radical having 5-6 C-atoms, and wherein 0.8-1.2 equivalents of blocked isocyanate are present groups per equivalent of hydroxyl groups, b. 0-3% by weight of a cross-linking catalyst, c. 30-60% by weight of an organic solvent or solvent mixture, wherein the percentages add up to 100%, and additionally d. 0-65% by weight of pigments and/or fillers, e. 0-5% by weight of dyes, and optionally f. 0.1-3% by weight of leveling agents, gloss improvers, antioxidants, and/or heat stabilizers.

DETAILED DESCRIPTION OF THE INVENTION AND PREFERRED EMBODIMENTS

The starting materials for the enamels of this invention are polyisocyanates having uretidinedione groups based on isophorone diisocyanate (IPDI), which contain uretininedione groups, are free of isocyanurate groups and can be more than 98% cleaved by heating back into isophorone diisocyanate. They are prepared by dimerization of IPDI using as a catalyst phosphines of the formula

wherein x=0, 1 or 2, and R represents identical or different substituents selected from the group consisting of H, alkyl, cycloalkyl, aralkyl, and aryl radicals.

The dimerization, which is not claimed here, can take place neat or preferably in inert organic solvents. Preferred solvents in this case are benzene, toluene, methyl- or ethylglycol acetate (EGA), dimethylformamide, xylene and other aromatic or aliphatic hydrocarbons, as well as ketones such as acetone, methyl butyl ketone, methyl isobutyl ketone or cyclohexanone and chlorinated aromatic hydrocarbons, and any mixtures of these with other inert organic solvents.

The dimerization is carried out in a temperature range of 0°–100° C., preferably between 0° and 60° C. Because the dimerization in the presence of catalysts is an equilibrium reaction and reaches the highest degree of dimerization at the lowest temperatures, the process is generally carried out at relatively low temperatures. Catalyst amounts of 0.2–3% by weight based on the IPDI used are adequate for dimerization of IPDI. The preferred amount is 0.5–2% by weight. After 10 to 20 hours of reaction time in the presence of the abovedisclosed catalysts at a reaction temperature of 0°–25° C. there is generally a free NCO content corresponding to a conversion of ca. 20–60% of the available NCO-groups of the IPDI.

The unreacted IPDI together with the catalyst is separated from the NCO-containing uretidinedione dimer of the IPDI by thin film evaporation at 130° C. and 0.1 torr.

The uretidinedione diisocyanate so prepared can be used either as the exclusive isocyanate component or in a mixture with IDPI free of uretidinedione groups. The addition of IDPI free of uretidinedione groups makes it simple to vary in a desired manner the characteristics of the product of the process particularly the melting point, since the monomer IPDI, free of uretidinedione groups, is introduced into the product of the process as an "interrupting component". It is particularly advantageous, with the method according to the invention, to use as the isocyanate component the abovementioned in situ produced IPDI mixture which is obtained by partial dimerization of IPDI with the disclosed catalysts. The IPDI derivative containing uretidinedione groups which is obtained in this manner, or a mixture of it with uretidinedione-free IPDI, represents a preliminary stage or intermediate for the products of the method according to the invention.

For use according to the invention, this intermediate product is converted, as hereinafter described, into the compound containing uretidinedione groups and partially or completely blocked terminal isocyanate groups.

If it is only partially blocked, it is advantageous to subject the isophorondiisocyanate derivative containing uretidinedione groups, either before or after this blocking, to a chain extension with glycols. Particularly suited glycols are ethylene glycol, diethylene glycol, 1,4-butanediol, 3-methylene-1,5-pentanediol, 1,6-hexanediol, dodecyl diols, dimethylol cyclohexanes, diols based on aromatic compounds, e.g., dimethylol benzene, etc.

Suitable blocking agents are particularly compounds having, preferably, a single group capable of reacting with an NCO-group, which enter into an addition reaction with organic isocyanates at temperatures above 50° C., preferably between 80° C. and 120° C., and whose addition products obtained in this manner, when mixed with nonvolatile polyols having primary OH-groups, react with the non-volatile polyols at temperatures between 140 and 300° C. with liberation of the blocking agent to form a urethane. Suitable blocking agents are oximes, such as formaldehyde oxime, acetadehyde oxime, acetone oxime, methyl ethyl ketone oxime, cyclohexanone oxime, acetophenone oxime, benzophenone oxime or diethylglyoxime, lactams such as ϵ-caprolactam, ϵ-valerolactam, ϵ-butyrolactam, phenols such as phenol, o-methylphenol and acetoacetic ester.

To carry out the blocking reaction, the IPDI derivative containing uretidinedione groups, optionally chain extended, is prepared, and the blocking agent is added. The reaction can be carried out neat or also in the presence of suitable solvents. Suitable solvents are, for example, benzene, toluene, methyl- or ethyl glycol acetate, dimethylformamide, xylene and other aromatic or aliphatic hydrocarbons, also ketones, such as acetone, methyl butyl ketone, methyl isobutyl ketone or cyclohexanone and chlorinated aromatic hydrocarbons as well as any mixtures of these with other inert organic solvents.

The blocking reaction is generally carried out at temperatures of 0°–150° C., preferably 80°–120° C. Here, too, the catalysts that accelerate the isocyanate-polyaddition reaction can be used. The auxiliary catalysts to be used comprise only those that have no strong basic groups, because catalysts having such strongly basic groups, which are themselves conventional catalysts in polyisocyanate chemistry, can cause a premature opening of the uretidinedione ring in the process of the invention. Consequently, in the method of the invention metallo-organic compounds, particularly organic tin compounds, are used as catalysts.

The partially or completely blocked polyisocyanates based on IPDI and containing uretidinedione groups are quite compatible with the polymers that contain hydroxyl groups. In organic solvents they yield homogenous solutions that are well suited for use as stoving enamels. The curable mixtures of this method are very stable in storage at room temperature, i.e. they do not change either physically or chemically, because the components of the stoving enamels do not react at room temperature. Depending on the use, the stoving enamels according to the invention cure in 40 minutes to 20 seconds in a temperature range of 100°–350° C., preferably between 130° C. and 300° C. During curing the hardener undergoes a deblocking whereby IPDI is liberated. The liberated NCO-groups then react with the OH-groups of the polyester by way of an NCO/OH reaction to form urethane bonds. The cured coatings or layers are characterized by very good chemical and mechanical characteristics as well as resistance to chemicals.

The preferred polymers containing hydroxyl groups are hydroxyl group-containing polyesters of aliphatic, cycloaliphatic and/or aromatic polycarboxylic acids with hydroxyl numbers between 40 and 240 mg KOH/g. For this use the polyesters should also have a low glass transition temperature, i.e., between 20° C.

and −25° C. The suitable polyesters have, in addition, more than two OH-groups on the average per molecule.

Suitable aliphatic, cycloaliphatic and aromatic (mono or polynuclear) polycarboxylic acids, are for example, oxalic acid, succinic acid, glutaric acid, 2,2-dimethylglutaric acid, adipic acid, 2,2,4- or 2,4,4-trimethyladipic acid, sebacic acid, dodecanedicarboxylic acid, terephthalic acid, methylterephthalic acid, 2,5 and 2,6-dimethylterephthalic acid, chloroterephthalic acid, 2,5-dichloroterephthalic acid, flouroterephthalic acid, isophthalic acid, phthalic acid, trimelittic acid, naphthalenedicarboxylic acid, particularly the 1,4-, 1,5-, 2,6-, and 2,7-isomers, phenylene diacetic acid, 4-carboxyphenoxyacetic acid, m- and p-terphenyl-4,4'''-dicarboxylic acid, dodecahydrodiphenic acid, tetrahydrophthalic acid, hexahydrophthalic acid, hexahydroterephthalic acid, 4,4'-diphenic acid, 2,2'- and 3,3'-dimethyl-4,4'diphenic acid, 2,2'-dibromo-4,4'-diphenic acid, bis(4-carboxyphenyl)methane, 1,1- and 1,2-bis(4-carboxyphenyl)ethane, 2,2-bis(4-carboxyphenyl)propane, 1,2-bis(4-carboxyphenoxy)ethane, bis-4-carboxyphenyl ether, bis-4-carboxyphenyl sulfide, bis-4-carboxyphenyl ketone, bis-4-carboxyphenylsulfoxide, bis-4-carboxyphenylsulfone, 2,8-dibenzofuranedicarboxylic acid, 4,4'-stilbenedicarboxylic acid and octadecahydro-m-terphenyl-4,4''-dicarboxylic acid, among others. Unsaturated acids which can be derived from the above-disclosed acids can also be used. Of course, the functional derivatives of the disclosed acids, such as anhydrides, esters, among others, can be used instead. Mixtures of these compounds can also be used.

Diols are preferred as the alcohol component in the preparation of the hydroxyl group-containing polyesters. It is also possible to incorporate other polyols, e.g. triols, to a limited extent. Examples of suitable diols are: ethylene glycol, propylene glycols, such as 1,2- and 1,3-propanediol and 2,2-dimethyl-1,3-propanediol, butanediols, such as 1,3- or 1,4-butanediol, 3-methyl-1,5-pentanediol, hexanediols, such as 1,6-hexane diol, 2,2,4-trimethyl-1,6-hexanediol, 2,2,4-trimethyl-1,6-hexanediol, 1,7-heptanediol, thioglycol, 1,18-octadecanediol, 2,4-dimethyl-2-propyl-1,3-heptanediol, 1,4-butenediol or 1,4-butynediol, diethylene glycol, triethylene glycol, cis- and trans-1,4-cyclohexanedimethanol, 1,4-cyclohexanediols, 2,2-bis-(4-hydroxycyclohexyl)propane, bis ethoxylated 2,2-bis(4-hydroxyphenyl)propane, and hydroxypivalic acid neopentyl glycol ester; examples of other polyols are: glycerin, 1,2,6-hexanetriol, 1,1,1-trimethylolpropane, 1,1,1-trimetholethane, and pentaerythritol, among others. Mixtures of the above-mentioned compounds can also be used.

In producing the polyester, the polyol is used in such amounts that there is more than 1 OH-group equivalent per carboxyl group equivalent, so that the result is polyesters having the described characteristics. The resulting polyesters are highly viscous resins.

The polyesters containing hydroxyl groups can be produced by known and conventional procedures, i.e. by esterification or transesterification, if necessary in the presence of catalysts. The following two methods lend themselves particularly to this end.

In the first case one begins with an acid free of mineral acid which can be purified by recrystallization if necessary. The ratio of the equivalents of acid to alcohol is naturally correlated with the desired molecular size and the required OH number. The reaction components are heated in a suitable apparatus while an inert gas, e.g. nitrogen, is passed through, after 0.005 –0.5% by weight, preferably 0.05–0.2% by weight of a catalyst is added, e.g. tin compounds, such as di-n-butyltin diester among others, or titanium esters, particularly tetraisopropyl titanate. Depending on the acid used, the first water liberation occurs, and the liberated water is distilled from the reaction mixture. Within several hours the reaction temperature is raised to 240° C. The reaction medium remains mostly inhomogenous until shortly before the end of the complete esterification. After ca. 24 hours the reaction is complete.

In a second method one begins, for example, with the dimethyl ester or another ester and esterifies with the desired alcohol while an inert gas, e.g. dry nitrogen, is passed through. Titanium esters, dialkyltin esters or dialkyltin oxides can be used in concentrations of 0.005 –0.5% by weight as transesterification catalysts. After reaching ca. 120° C. the first methanol liberation usually occurs. The temperature is raised to 220°–230° C. over several hours. Depending on the ingredients the transesterification is complete after 2-24 hours.

Solvents whose boiling point is at least 100° C. or more are suitable for the single component stoving enamel according to the invention. The boiling point of the solvent used depends on the particular stoving temperatures. The higher these are, the higher the boiling point of the solvent can be. The following compounds are possible solvents:

Aromatic hydrocarbons such as toluene, xylenes (also technical grade mixtures), tetrahydronaphthalene, cumene among others; ketones such as methylisobutyl ketone, diisobutyl ketone, isophorone and esters such as n-hexyl acetate, ethylglycol acetate, n-butylenesglycol acetate, etc. Mixtures of these compounds can also be used.

So-called leveling agents are used to improve the flow characteristics of the enamels. These agents can be compounds of very varied chemical classes or mixtures of them, e.g. polymeric or monomeric compounds, acetals such as polyvinyl formal, polyvinyl acetal, polyvinyl butyral, or polyvinylacetobutyral di-2-ethylhexyl-i-butyraldehyde acetal di-2-ethylhexyl-n-butyraldehyde acetal, diethyl-2-ethylhexanol acetal, di-n-butyl-2-ethyl-hexanolacetal, di-i-butyl-2-ethyl-hexanol acetal, di-2-ethylhexylacetaldehyde acetal, among others;

ethers such as the polymeric polyethylene- and polypropylene glycols, copolymers of n-butylacrylate and vinyl isobutyl ether, ketone-aldehyde-condensation resins, solid silicone resins, silicone oils; also mixtures of zinc soaps, of fatty acids and aromatic carboxylic acids, and the like. Such leveling agents can be present in the mixtures in amounts of up to 3.0% by weight based on the total amount of binder (polyester +blocked polyisocyanate), cross-linking catalyst and solvent or solvent mixture.

The reaction of the polyester containing hydroxyl groups with the polyisocyanates liberated by deblocking can be accelerated by catalysts in the given amounts. Examples of suitable catalysts are organic sulfonic acids on the one hand and organic tin compounds such as di-n-butyltin dilaurate on the other.

The other components of the stoving enamel such as dyes, pigments, fillers, such as titanium dioxide, carbon black, organic and inorganic color pigments, talc, barite, and the like, thixotropic agents, UV- and oxidation stabilizers and others can vary in amount within the given range, based on the amount of binding agent (polyester + blocked polyisocyanate containing uretidinedione groups), cross-linking catalyst and solvents or solvent mixtures.

The single component stoving enamels according to the invention can be produced by simple mixing of the three components of the enamel, the polyester containing hydroxyl groups, the blocked polyisocyanate and solvent or solvent mixture, at 80°–100° C. in a suitable mixing apparatus, e.g. a stirred kettle. The customary additives such as pigments, leveling agents, gloss improvers, antioxidants and heat stabilizers can also be simply added to the enamel solution.

The single component stoving enamel can be applied to the object to be coated by conventional methods.

After application the coats are cured by heating to temperatures above the cleaving temperature of the curing agent, i.e. 130°–350° C., preferably 160°–300° C. The resulting coating has the described advantages.

All substrates are suited for coating with the single component enamels according to the invention as long as they can withstand the given curing temperatures without detriment to their mechanical properties, for example, metal surfaces and the like.

The enamels of the invention are primarily useful in coil-coating enameling to produce weather-resistant one-and two-coat enamel coatings.

PREPARATIVE EXAMPLES

A. Isocyanate Components

1. Preparation of the Isophoronediisocyanate Derivative Containing Uretidinedione Groups 100 parts by weight of IPDI are mixed with 1.0 parts by weight of tris(dimethylamino)phosphine and allowed to stand at room temperature for 20 hours. The NCO content of the mixture after this time amounted to 31% by weight, i.e. ca. 40% of the IPDI had reacted. Then this mixture was subjected to thin film distillation at 130° C. and 0.1 torr. The residue was free of the catalyst and IPDI and had an NCO content of 17.6%. When the residue was heated 60 minutes at 180° C., the NCO content increased to 37.4%. This so-called 'hot value' was a direct measure of the content of uretidinedione groups in the reaction product.

2. Blocking the Isophoronediisocyanate Derivative Containing Uretidinedione Groups with ε-caprolactam 113 parts by weight of ε-caprolactam were added in portions to 238.6 parts by weight of the reaction product produced according to A1 at 80°–100° C. so that the reaction temperature did not exceed 120° C. After all the ε-caprolactam was added, the mixture was heated at 100° C. until the NCO content was reduced below 0.4%. The reaction product had the following physical properties:

| NCO content (latent) | 25.15% |
|---|---|
| Melting point | 72–78° C. |
| Glass Transition Temp. (DTA) | 52–67° C. |

Timed discharge viscosity in a DIN-4 beaker at 20° C. of a 60% solution in

| (a) butyl acetate/xylene 1:3 | 45 seconds |
|---|---|
| (b) EGA/xylene 1:2 | 63 seconds |
| (c) EGA/Solvesso ® 150 1:2 | 145 seconds |

3. Blocking the Isophorondiisocyanate Derivative Containing Uretidinedione Groups with Acetone Oxime 73 parts by weight of acetone oxime were added in portions to 238.6 parts by weight of the reaction product prepared according to the procedures of Section A1 at 80°–100° C. so that the reaction temperature did not exceed 120° C. After the acetone oxime was added, the mixture was heated at 100° C. until the NCO content was reduced below 0.4%. The reaction product had the following physical data:

| NCO content (latent) | 28.33% |
|---|---|
| Melting point | 74–81° C. |
| Glass Transition Temp. (DTA) | 54–68° C. |

Timed discharge viscosity in a DIN-4 beaker at 20° C. of the 60% solution in

| (a) butyl acetate/xylene 1:3 | 50 seconds |
|---|---|
| (b) EGA/xylene 1:2 | 69 seconds |
| (c) EGA/Solvesso ® 150 1:2 | 155 seconds |

4. Partial Blocking of the Isophoronediisocyanate Derivative Containing Uretidinedione Groups General Preparation Procedures To a mixture of the reaction product prepared dibutyltin dilaurate, the blocking agent was added in portions at 70°–80° C. so that the temperature did not exceed 100° C. After the blocking agent had been added the mixture was heated at 100° C. until the conversion was complete. The conversion was monitored by means of titrimetric NCO determination.

a. Blocking with ε-caprolactam
  485.1 parts by weight of the product of section A1
  114.9 parts by weight of ε-caprolactam
  400.0 parts by weight of solvent

| | Butyl acetate/xylene 1:3 | EGA/xylene 1:2 | EGA/Solvesso ® 1:2 |
|---|---|---|---|
| NCO theor. content (free) | 4.3% | 4.3% | 4.3% |
| pract. | 4.0–4.1% | 4.0–4.2% | 4.0–4.2% |
| NCO content (latent) | 29.91% | 29.91% | 29.91% |
| Discharge viscosity at 20° C. in a DIN-4 beaker in seconds | 25 | 29 | 40 | b. Blocking with ε-caprolactam
  536.5 parts by weight of the product of section A1
  63.5 parts by weight of ε-caprolactam
  400.0 parts by weight of solvent

| | Butyl acetate/xylene 1:3 | EGA/xylene 1:2 | EGA/Solvesso ® 1:2 |
|---|---|---|---|
| NCO theor. content (free) | 7.1% | 7.1% | 7.1% |
| pract. | 6.8–7.0% | 6.8–7.0% | 6.8–7.0% |
| NCO content (latent) | 33.08% | 33.08% | 33.08% |

-continued

|  | Butyl acetate/xylene 1:3 | EGA/xylene 1:2 | EGA/Solvesso ® 1:2 |
|---|---|---|---|
| Discharge viscosity at 20° C. in a DIN-4 beaker in seconds | 13 | 20 | 25 | c. Blocking with acetone oxime
520.4 parts by weight of the product of section A1
79.6 parts by weight of acetone oxime
400.0 parts by weight of solvent

|  | Butyl acetate/xylene 1:3 | EGA/xylene 1:2 | EGA/Solvesso ® 1:2 |
|---|---|---|---|
| NCO theor. | 4.6% | 4.6% | 4.6% |
| content pract. (free) | 4.3–4.5% | 4.3–4.5% | 4.3–4.5% |
| NCO content (latent) | 32.09% | 32.09% | 32.09% |
| Discharge viscosity at 20° C. in a DIN-4 beaker in seconds | 27 | 33 | 45 | d. Blocking with acetone oxime
557.4 parts by weight of the product of section A1
42.6 parts by weight of acetone oxime
400.0 parts by weight of solvent

|  | Butyl acetate/xylene 1:3 | EGA/xylene 1:2 | EGA/Solvesso ® 1:2 |
|---|---|---|---|
| NCO theor. | 7.4% | 7.4% | 7.4% |
| content pract. (free) | 7.1–7.3% | 7.1–7.3% | 7.1–7.3% |
| NCO content (latent) | 34.37% | 34.37% | 34.37% |
| Discharge viscosity at 20° C. in a DIN-4 beaker in seconds | 16 | 22 | 27 |

B. Polyester (1) 7 moles (1162 g) of isophthalic acid, 2 moles (268 g) of trimethylolpropane, 5 moles (590 g) of 1,6-hexanediol and 1 mole (160 g) of 2,2,4 or 2,4,4-trimethyl-1,6-hexandiol were placed in a 4 liter glass flask for esterification. 0.05% by weight of di-n-butyltin oxide was added as the esterification catalyst. At ca. 190° C. the first water liberation occurred. Within 6 to 8 hours the temperature was raised to 220° C. The esterification was completed in 6 hours at 220° C. The polyester was cooled to 200° C. and largely freed of volatile components by applying a vacuum (15–30 mm Hg) for 30–45 minutes. A small stream of $N_2$ was passed through the reaction mixture during the entire reaction.

| Physical Properties | |
|---|---|
| OH number | 90–105 mg KOH/g |
| Acid number | <2 mg KOH/g |
| Glass Transition Temp. (DTA) | 4–12° C. |

Discharge viscosity in a DIN-4 beaker at 20° C. of a 60% solution in

| a. butyl acetate/xylene 1:3 | 405 seconds |
|---|---|
| b. EGA/xylene 1:2 | 573 seconds |
| c. EGA/Solvesso ® 150 1:2 | 1006 seconds |

(2) 7 moles (1162 g) of isophthalic acid, 6 moles (708 g) of 1,6-hexanediol and 2 moles (268 g) of trimethylolpropane were esterified as in B1 to an acid number <2 mg KOH/g.

| Physical Properties | |
|---|---|
| OH number | 105 mg KOH/g |
| Acid number | <2 mg KOH/g |
| Glass Transition Temp. (DTA) | +4° C. to +12° C. |

Discharge viscosity in a DIN-4 beaker at 20° C. of a 60% solution in

| a. butyl acetate/xylene 1:3 | 525 seconds |
|---|---|
| b. EGA/xylene 1:2 | 657 seconds |
| c. EGA/Solvesso ® 150 1:2 | 1133 seconds |

3. 7 moles (1162 g) of isophthalic acid, 5 moles (590 g) of 1,6-hexanediol, 1 mole of 3-methyl-1,5-pentanediol, and 2 moles (268 g) of trimethylolpropane were esterified as in B1 to an acid number of 2 mg KOH/g.

| Physical Properties | |
|---|---|
| OH number | 95–105 mg KOH/g |
| Acid number | <2 mg KOH/g |
| Glass Transition Temp (DTA) | +4° C. to 16° C. |

Discharge viscosity in a DIN-4 beaker at 20° of a 60% solution in

| a. butyl acetate/xylene 1:3 | 300 seconds |
|---|---|
| b. EGA/xylene 1:2 | 470 seconds |
| c. EGA/Solvesso ® 150 1:2 | 751 seconds |

CI. Polyurethane Stoving Enamels (Fully Blocked)

The described 60% isocyanate solution and the 60% polyester solution were both used to formulate the pigmented enamel systems.

EXAMPLE 1

100 parts by weight of the polyester solution of B1 were mixed with 28.9 parts by weight of the blocked isocyanate solution of A2 and then ground in a sand mill with 66.3 parts by weight white pigment (TiO$_2$) and 0.48 parts by weight leveling agent (silicone oil OL; manufacturer Bayer AG).

This was applied to 1 mm steel and aluminum sheets and cured in a recirculating dryer.

Table 1 gives a summary of the curing conditions and the mechanical data of the enamel films. The thickness of the enamel film layers was between 25 and 30μ.

| Stoving Conditions Time/Temp | Mechanical Data | | | | | | | | |
|---|---|---|---|---|---|---|---|---|---|
| | HK | HB | EC | Imp. Rev. | T-Bend Test | Pencil Hardness | GT | GG 20° | GG 60° |
| 90"/300° C. | 168 | 111 | >10 | >82 | 0-1 | 2 H | 0 | 70-73 | 85-88 |
| 5'/200° C. | 167 | 100 | >10 | >82 | 0 | 2 H | 0 | 71-74 | 84-89 |
| 7'/200° C. | 169 | 111 | >10 | >82 | 0-1 | 2 H | 0 | 70-75 | 85-90 |
| 15'/180° C. | 168 | 111 | >10 | >82 | 0-1 | 2 H | 0 | 70-74 | 83-88 |
| 30'/160° C. | 161 | 100 | >10 | >82 | 0-1 | 2 H | 0 | 71-76 | 84-87 |

2.8% ε-caprolactam was split off.

The abbreviations in this and the following tables are:
HK=König hardness in sec. (DIN 53 157)
HB=Buchholz hardness (DIN 53 153)
EC=Erichsen cupping in mm (DIN 53 156)
GT=Incised grid test (DIN 53 151)
GG 20° and 60°=Gardner gloss test (ASTM-D 523)
Imp. rev.=reverse impact in inch.lb

EXAMPLE 2

Preparation, application and enamel curing were done as in Example C1.

Composition 100.00 parts by weight of polyester solution according to B2
29.95 parts by weight of blocked isocyanate solution according to A2
66.85 parts by weight of white pigment (TiO₂)
0.40 parts by weight of silicone oil Table 2 summarizes the curing conditions and the mechanical data for the enamel films; the thickness of the enamel films was 25–30μ.

| Stoving Conditions Time/Temp | Mechanical Data | | | | | | | | |
|---|---|---|---|---|---|---|---|---|---|
| | HK | HB | EC | Imp. Rev. | T-Bend Test | Pencil Hardness | GT | GG 20° | GG 60° |
| 90"/300° C. | 162 | 100 | >10 | >82 | 0 | 2 H | 0 | 78-80 | 88-90 |
| 5'/200° C. | 160 | 100 | >10 | >82 | 0 | 2 H | 0 | 78-80 | 89-91 |
| 7'/200° C. | 165 | 111 | >10 | >82 | 0 | 2 H | 0 | 78-84 | 91 |
| 15'/180° C. | 164 | 111 | >10 | >82 | 0 | 2 H | 0 | 80-83 | 91 |
| 30'/160° C. | 159 | 100 | >10 | >82 | 0-1 | H-2 H | 0 | 81-83 | 90-92 |

2.89% ε-caprolactam was split off.

EXAMPLE 3

Preparation, application and enamel curing were done as in Example C1.

Composition 100.00 parts by weight of polyester solution according to B3
30.84 parts by weight of blocked isocyanate solution according to A2
67.31 parts by weight of white pigment (TiO₂)
0.40 parts by weight of silicone oil Table 3 summarizes the curing conditions and the mechanical data for the enamel films. The thickness of the test coatings was 25–30μ.

| Stoving Conditions Time/Temp | Mechanical Data | | | | | | | | |
|---|---|---|---|---|---|---|---|---|---|
| | HK | HB | EC | Imp. Rev. | T-Bend Test | Pencil Hardness | GT | GG 20° | GG 60° |
| 90"/300° C. | 152 | 111 | >10 | >82 | 0 | 2 H | 0 | 73-75 | 84-87 |
| 5'/200° C. | 149 | 100 | >10 | >82 | 0 | 2 H | 0 | 73-76 | 85-88 |
| 7'/200° C. | 153 | 111 | >10 | >82 | 0 | 2 H | 0 | 74-77 | 84-89 |
| 15'/180° C. | 150 | 111 | >10 | >82 | 0 | 2 H | 0 | 73-78 | 86-88 |
| 30'/160° C. | 148 | 100 | >10 | >82 | 0 | 2 H | 0 | 72-77 | 83-89 |

2.95% ε-caprolactam was split off.

EXAMPLE 4

Preparation, application and enamel curing were done as in C1.

Composition 100.00 parts by weight of the polyester solution of B1
25.60 parts by weight of the blocked isocyanate solution of A3
64.60 parts by weight of white pigment (TiO₂)
0.39 parts by weight of silicone oil OL Table 4 summarizes the curing conditions and the mechanical data of the enamel films. The thickness of the test coatings was 25–30μ.

| Stoving Conditions Time/Temp | Mechanical Data | | | | | | | | |
|---|---|---|---|---|---|---|---|---|---|
| | HK | HB | EC | Imp. Rev. | T-Bend Test | Pencil Hardness | GT | GG 20° | GG 60° |
| 80"/300° C. | 164 | 100 | >10 | >82 | 0 | 2 H | 0 | 71 | 85-87 |
| 4'/200° C. | 165 | 111 | >10 | >82 | 0-1 | 2 H | 0 | 72-75 | 84-86 |
| 5'/200° C. | 164 | 100 | >10 | >82 | 0 | 2 H | 0 | 70-74 | 85-88 |
| 10'/180° C. | 166 | 100 | >10 | >82 | 0 | 2 H | 0 | 71-75 | 83-87 |
| 25'/160° C. | 169 | 111 | >10 | >82 | 0-1 | 2 H | 0 | 73 | 86-90 |

-continued

| Stoving Conditions Time/Temp | HK | HB | EC | Imp. Rev. | T-Bend Test | Pencil Hardness | GT | GG 20° | GG 60° |
|---|---|---|---|---|---|---|---|---|---|
| 30'/150° C. | 164 | 111 | >10 | >82 | 0 | H-2 H | 0 | 72-76 | 86-89 |
| 35'/140° C. | 161 | 100 | >10 | >82 | 0 | 2 H | 0 | 70-74 | 85-88 |

1.87% acetone oxime was split off.

EXAMPLE 5

Preparation, application and enamel curing were done as in C1.

Composition 100.00 parts by weight of the polyester solution of B2
26.55 parts by weight of the blocked isocyanate solution of A3
65.10 parts by weight of white pigment (TiO$_2$)
0.38 parts by weight of silicone oil OL Table 5 shows the curing conditions and the mechanical data of the enamel films. The thickness of the test coatings was 25-30μ.

| Stoving Conditions Time/Temp | HK | HB | EC | Imp. Rev. | T-Bend Test | Pencil Hardness | GT | GG 20° | GG 60° |
|---|---|---|---|---|---|---|---|---|---|
| 80"/300° C. | 162 | 111 | >10 | >82 | 0-1 | 2 H | 0 | 78 | 88-90 |
| 4'/200° C. | 165 | 100 | >10 | >82 | 0 | 2 H | 0 | 78-82 | 91 |
| 5'/200° C. | 164 | 111 | >10 | >82 | 0 | 2 H | 0 | 83 | 90-93 |
| 10'/180° C. | 167 | 111 | >10 | >82 | 0-1 | 2 H | 0 | 81 | 89-93 |
| 25'/160° C. | 168 | 100 | >10 | >82 | 0-1 | 2 H | 0 | 80-82 | 94 |
| 30'/150° C. | 161 | 100 | >10 | >82 | 0 | 2 H | 0 | 79-84 | 90-94 |
| 35'/140° C. | 163 | 100 | >10 | >82 | 0 | 2 H | 0 | 82-84 | 89-94 |

1.92% of acetone oxime was split off.

EXAMPLE 6

Preparation, application and enamel curing were done as in C1.

Composition 100.00 parts by weight of the polyester solution of B3
27.34 parts by weight of the blocked isocyanate solution of A3
65.50 parts by weight of white pigment (TiO$_2$)
0.39 parts by weight of silicone oil OL Table 6 gives a summary of the curing conditions and the mechanical data for the enamel films. The thickness of the test coatings was 25-30μ.

| Stoving Conditions Time/Temp | HK | HB | EC | Imp. Rev. | T-Bend Test | Pencil Hardness | GT | GG 20° | GG 60° |
|---|---|---|---|---|---|---|---|---|---|
| 80"/300° C. | 150 | 100 | >10 | >82 | 0 | 2 H | 0 | 73-76 | 82-86 |
| 4'/200° C. | 149 | 111 | >10 | >82 | 0 | 2 H | 0 | 71-77 | 82-88 |
| 5'/200° C. | 151 | 100 | >10 | >82 | 0 | 2 H | 0 | 74-78 | 83-87 |
| 10'/180° C. | 148 | 100 | >10 | >82 | 0 | 2 H | 0 | 72-77 | 84-88 |
| 25'/160° C. | 150 | 100 | >10 | >82 | 0 | 2 H | 0 | 73-79 | 82-83 |
| 30'/150° C. | 151 | 111 | >10 | >82 | 0 | 2 H | 0 | 71-76 | 83-88 |
| 35'/140° C. | 149 | 100 | >10 | >82 | 0 | 2 H | 0 | 72-77 | 82-87 |

1.92% acetone oxime was split off.

C II. Polyurethane Stoving Enamels (partially blocked)
General Preparation Procedures To the 60% or 50% partially blocked IPDI adduct solutions containing uretidinedione groups, which were prepared in accordance with the procedures of section A4, were added the corresponding 60% polyester solutions according to B, in the stoichiometric ratio, at 60°-70° C., additionally provided, if necessary, with 0.1% by weight of dibutyltin dilaurate. The mixture was held at this temperature until the free NCO content fell to <0.2%. Then a leveling agent (silicone oil OL; manufacturer: Bayer AG) and white pigment (TiO$_2$) were added to the 60% enamel solutions, which were optionally further thinned with solvents and ground in a sand mill.

The enamel was applied to 1 mm steel and aluminum sheets and cured in a recirculating dryer

EXAMPLE 7

100.00 parts by weight of the polyester solution of B1
24.79 parts by weight of the blocked isocyanate solution of A4a
67.40 parts by weight of white pigment (TiO$_2$)
0.39 parts by weight of silicone oil OL Table 7 summarizes the curing conditions and the mechanical data for the enamel films. The thickness of the enamel films was between 25 and 30μ.

| Stoving Conditions Time/Temp | HK | HB | EC | Imp. Rev. | T-Bend Test | Pencil Hardness | GT | GG 20° | GG 60° |
|---|---|---|---|---|---|---|---|---|---|
| 90"/300° C. | 168 | 111 | >10 | >82 | 0-1 | 2 H | 0 | 71-74 | 85-87 |
| 5'/200° C. | 169 | 100 | >10 | >82 | 0 | 2 H | 0 | 70-73 | 83-87 |

-continued

| Stoving Conditions Time/Temp | Mechanical Data | | | | | | | | |
|---|---|---|---|---|---|---|---|---|---|
| | HK | HB | EC | Imp. Rev. | T-Bend Test | Pencil Hardness | GT | GG 20° | GG 60° |
| 7'/200° C. | 170 | 111 | >10 | >82 | 0-1 | 2 H-3 H | 0 | 70-74 | 85-89 |
| 15'/180° C. | 166 | 111 | >10 | >82 | 0-1 | 2 H | 0 | 72-74 | 82-87 |
| 30'/160° C. | 167 | 100 | >10 | >82 | 0-1 | 2 H | 0 | 70-75 | 84-88 |

1.48% of ε-caprolactam was split off.

EXAMPLE 8

Preparation, application and enamel curing were done as described in Example CII7.

Composition 100.00 parts by weight of the polyester solution of B2
25.29 parts by weight of the blocked isocyanate solution of A4a
64.45 parts by weight of white pigment (TiO$_2$)
0.38 parts by weight of silicone oil OL Table 8 summarizes the curing conditions and the mechanical data for the enamel films. The thickness of the enamel films was 25–30μ.

| Stoving Conditions Time/Temp | Mechanical Data | | | | | | | | |
|---|---|---|---|---|---|---|---|---|---|
| | HK | HB | EC | Imp. Rev. | T-Bend Test | Pencil Hardness | GT | GG 20° | GG 60° |
| 90"/300° C. | 164 | 100 | 10 | 82 | 0-1 | 2 H | 0 | 77-80 | 88-90 |
| 5'/200° C. | 166 | 100 | 10 | 82 | 0 | 2 H | 0 | 76-79 | 88-90 |
| 7'/200° C. | 169 | 111 | 10 | 82 | 0 | 2 H | 0 | 78-82 | 90 |
| 15'/180° C. | 165 | 111 | 10 | 82 | 0 | 2 H | 0 | 80-84 | 91 |
| 30'/160° C. | 162 | 100 | 10 | 82 | 0-1 | H-2 H | 0 | 80-83 | 89-90 |

1.50% of ε-caprolactam was split off.

EXAMPLE 9

Preparation, application and enamel curing were done as in CII7.

Composition 100.00 parts by weight of the polyester solution of B3
25.80 parts by weight of the blocked isocyanate of A4a
67.95 parts by weight of white pigment (TiO$_2$)
0.39 parts by weight of silicone oil OL Table 9 summarizes the curing conditions and the mechanical data for the enamel films. The thickness of the test coatings was 25–30μ.

| Stoving Conditions Time/Temp | Mechanical Data | | | | | | | | |
|---|---|---|---|---|---|---|---|---|---|
| | HK | HB | EC | Imp. Rev. | T-Bend Test | Pencil Hardness | GT | GG 20° | GG 60° |
| 90"/300° C. | 180 | 111 | >10 | >82 | 0-1 | 3 H | 0 | 69-72 | 81-85 |
| 5'/200° C. | 182 | 111 | >10 | >82 | 0 | 3 H | 0 | 65-70 | 80-86 |
| 7'/200° C. | 180 | 111 | >10 | >82 | 0-1 | 3 H | 0 | 68-72 | 79-84 |
| 15'/180° C. | 178 | 111 | >10 | >82 | 0-1 | 3 H | 0 | 70-74 | 81-84 |
| 30'/160° C. | 176 | 100 | >10 | >82 | 0 | 3 H | 0 | 68-70 | 80-86 |

1.53% of ε-caprolactam was split off.

EXAMPLE 10

Preparation, application and enamel curing were done as in CII7.

Composition 100.00 parts by weight of the polyester solution of B1
23.07 parts by weight of the blocked isocyanate solution of A4c
66.47 parts by weight of white pigment (TiO$_2$)
0.38 parts by weight of silicone oil OL Table 10 summarizes the curing conditions and the mechanical data for the enamel films. The thickness of the test coatings was 25–30μ.

| Stoving Conditions Time/Temp | Mechanical Data | | | | | | | | |
|---|---|---|---|---|---|---|---|---|---|
| | HK | HB | EC | Imp. Rev. | T-Bend Test | Pencil Hardness | GT | GG 20° | GG 60° |
| 90"/300° C. | 166 | 100 | >10 | >82 | 0-1 | 2 H | 0 | 72 | 83-86 |
| 4'/200° C. | 167 | 111 | >10 | >82 | 0-1 | 2 H | 0 | 74-76 | 82-87 |
| 6'/200° C. | 165 | 100 | >10 | >82 | 0 | 2 H | 0 | 71-73 | 86-88 |
| 10'/180° C. | 164 | 100 | >10 | >82 | 0 | H-2 H | 0 | 70-72 | 83-86 |
| 20'/170° C. | 168 | 111 | >10 | >82 | 0-1 | 2 H | 0 | 75 | 84-89 |
| 30'/160° C. | 167 | 111 | >10 | >82 | 0 | 2 H | 0 | 73-74 | 85-88 |
| 35'/150° C. | 162 | 100 | >10 | >82 | 0-1 | H-2 H | 0 | 72-76 | 85-89 |

0.97% of acetone oxime was split off.

EXAMPLE 11

Preparation, application and enamel curing were done as in CII7.

Composition 100.00 parts by weight of the polyester solution of B2
23.54 parts by weight of the blocked isocyanate solution of A4c
66.73 parts by weight of white pigment (TiO$_2$)

0.38 parts by weight of silicone oil OL

Table 11 summarizes the curing conditions and the mechanical data for the enamel films. The thickness of the enamel films was 25–30μ.

| Stoving Conditions Time/Temp | Mechanical Data | | | | | | | | |
|---|---|---|---|---|---|---|---|---|---|
| | HK | HB | EC | Imp. Rev. | T-Bend Test | Pencil Hardness | GT | GG 20° | GG 60° |
| 90″/300° C. | 162 | 111 | 10 | 82 | 0–1 | 2 H | 0 | 78 | 88–90 |
| 4′/200° C. | 163 | 100 | 10 | 82 | 0 | 2 H | 0 | 79–83 | 90 |
| 6′/200° C. | 166 | 111 | 10 | 82 | 0 | 2 H | 0 | 80–82 | 89–93 |
| 10′/180° C. | 164 | 111 | 10 | 82 | 0–1 | 2 H | 0 | 82 | 89–94 |
| 20′/170° C. | 165 | 100 | 10 | 82 | 0–1 | 2 H | 0 | 79–82 | 92 |
| 30′/160° C. | 161 | 100 | 10 | 82 | 0 | H–2 H | 0 | 80–84 | 90–95 |
| 35′/150° C. | 162 | 100 | 10 | 82 | 0 | 2 H | 0 | 81–85 | 88–92 |

0.98% of acetone oxime was split off.

EXAMPLE 12

Preparation, application and enamel curing were done as in CII7.

Composition 100.00 parts by weight of the polyester solution of B3
24.01 parts by weight of the blocked isocycnate solution of A4c
66.98 parts by weight of white pigment (TiO$_2$)
0.38 parts by weight of silicone oil OL Table 12 summarizes the curing conditions and the mechanical data for the enamel films. The thickness of the test coatings was 25–30μ.

| Stoving Conditions Time/Temp | Mechanical Data | | | | | | | | |
|---|---|---|---|---|---|---|---|---|---|
| | HK | HB | EC | Imp. Rev. | T-Bend Test | Pencil Hardness | GT | GG 20° | GG 60° |
| 90″/300° C. | 178 | 100 | >10 | >82 | 0 | 3 H | 0 | 74–76 | 82–86 |
| 4′/200° C. | 177 | 111 | >10 | >82 | 0–1 | 3 H | 0 | 70–73 | 83–88 |
| 6′/200° C. | 180 | 125 | >10 | >82 | 0 | 3 H | 0 | 72–76 | 84–89 |
| 10′/180° C. | 179 | 100 | >10 | >82 | 0 | 3 H | 0 | 72–78 | 82–86 |
| 20′/170° C. | 177 | 111 | >10 | >82 | 0 | 3 H | 0 | 74–79 | 83–87 |
| 30′/160° C. | 175 | 111 | >10 | >82 | 0–1 | 3 H | 0 | 72–78 | 84–89 |
| 35′/140° C. | 176 | 100 | >10 | >82 | 0 | 3 H | 0 | 70–77 | 82–86 |

1.00% of acetone oxime was split off.

EXAMPLE 13

Preparation, application, and enamel hardening were done as in CII7.

Composition 100.00 parts by weight of the polyester solution of B2
22.69 parts by weight of the blocked isocyanate solution of A4b
52.73 parts by weight of white pigment (TiO$_2$)
0.35 parts by weight of silicone oil OL Table 13 summarizes the curing conditions and the mechanical data for the enamel films. The thickness of the test coatings was 25–30μ.

| Stoving Conditions Time/Temp | Mechanical Data | | | | | | | | |
|---|---|---|---|---|---|---|---|---|---|
| | HK | HB | EC | Imp. Rev. | T-Bend Test | Pencil Hardness | GT | GG 20° | GG 60° |
| 90″/300° C. | 167 | 125 | >10 | >82 | 0 | 2 H | 0 | 71–77 | 80–84 |
| 5′/200° C. | 164 | 111 | >10 | >82 | 0–1 | 2 H | 0 | 73–75 | 82–87 |
| 7′/200° C. | 169 | 111 | >10 | >82 | 0 | 2 H | 0 | 72–76 | 81–86 |
| 10′/180° C. | 168 | 125 | >10 | >82 | 0 | 2 H | 0 | 70–75 | 80–85 |
| 20′/170° C. | 166 | 111 | >10 | >82 | 0 | 2 H | 0 | 72–78 | 82–86 |
| 30′/160° C. | 167 | 111 | >10 | >82 | 0–1 | 2 H | 0 | 71–77 | 81–87 |

0.68% of ε-caprolactam was split off.

EXAMPLE 14

Preparation, application and enamel hardening were done as in CII7.

Composition 100.00 parts by weight of the polyester solution of B3
23.14 parts by weight of the blocked isocyanate solution of A4b
52.93 parts by weight of white pigment (TiO$_2$)
0.35 parts by weight of silicone oil OL Table 14 summarizes the curing conditions and the mechanical data for the enamel films. The thickness of the test coatings was 25–30μ.

| Stoving Conditions Time/Temp | Mechanical Data | | | | | | | | |
|---|---|---|---|---|---|---|---|---|---|
| | HK | HB | EC | Imp. Rev. | T-Bend Test | Pencil Hardness | GT | GG 20° | GG 60° |
| 90″/300° C. | 174 | 111 | >10 | >82 | 0 | 3 H | 0 | 70–73 | 81–86 |
| 5′/200° C. | 173 | 111 | >10 | >82 | 0–1 | 2 H–3 H | 0 | 72–76 | 80–85 |
| 7′/200° C. | 176 | 125 | >10 | >82 | 0 | 3 H | 0 | 69–75 | 79–87 |
| 10′/180° C. | 175 | 111 | >10 | >82 | 0 | 3 H | 0 | 71–77 | 82–86 |

| Stoving Conditions Time/Temp | HK | HB | EC | Imp. Rev. | T-Bend Test | Pencil Hardness | GT | GG 20° | GG 60° |
|---|---|---|---|---|---|---|---|---|---|
| 20'/170° C. | 178 | 111 | >10 | >82 | 0-1 | 3 H | 0 | 70-75 | 81-85 |
| 30'/160° C. | 174 | 111 | >10 | >82 | 0 | 2 H-3 H | 0 | 72-77 | 82-88 |

0.69% of ε-caprolactam was split off.

EXAMPLE 15

Preparation, application and enamel hardening were done as described in CII7.

Composition 100.00 parts by weight of the polyester solution of B2
21.95 parts by weight of the blocked isocyanate solution of A4d
52.41 parts by weight of white pigment (TiO₂)
0.35 parts by weight of silicone oil OL Table 15 summarizes the curing conditions and the mechanical data for the enamel films. The thickness of the test coatings was 25-30μ.

| Stoving Conditions Time/Temp | HK | HB | EC | Imp. Rev. | T-Bend Test | Pencil Hardness | GT | GG 20° | GG 60° |
|---|---|---|---|---|---|---|---|---|---|
| 90"/300° C. | 165 | 125 | >10 | >82 | 0-1 | 2 H | 0 | 69-74 | 80-84 |
| 4'/200° C. | 163 | 125 | >10 | >82 | 0 | 2 H | 0 | 71-75 | 82-85 |
| 6'/200° C. | 170 | 125 | >10 | >82 | 0 | 2 H-3 H | 0 | 70-76 | 81-88 |
| 10'/180° C. | 169 | 111 | >10 | >82 | 0 | 2 H | 0 | 71-77 | 84-86 |
| 20'/170° C. | 167 | 125 | >10 | >82 | 0 | 2 H | 0 | 71-77 | 80-87 |
| 30'/160° C. | 169 | 111 | >10 | >82 | 0-1 | 2 H | 0 | 70-76 | 82-86 |
| 35'/150° C. | 167 | 111 | >10 | >82 | 0 | 2 H | 0 | 72-78 | 80-85 |

0.45% of acetone oxime was split off.

We claim:
1. A stoving enamel comprising:
   a. 40-70% by weight of a mixture of:
   (1) a polymer containing hydroxyl groups having a hydroxyl number between 50 and 240 mg KOH/g, and
   (2) an isocyanurate-free derivative of isophorone diisocyanate containing blocked isocyanate groups having the formula

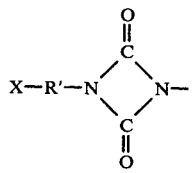

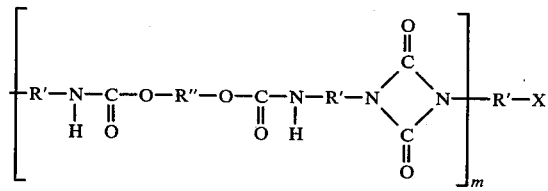

wherein:
X= —N=C=O or

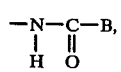

m=0-6,

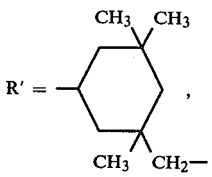

R''=divalent residue of a diol of 2-12 carbon atoms,

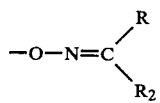

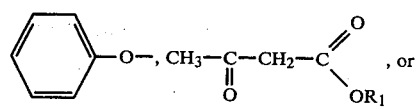

$R_1$ and $R_2$=identical or different aliphatic hydrocarbon radicals having 1-4 C-atoms or $R_1$ and $R_2$ together with the C-atom bound to the nitrogen atom by a double bond form a cycloaliphatic hydrocarbon ring having 5-6 C-atoms, wherein said mixture contains 0.8-1.2 equivalents of blocked isocyanate groups per equivalent of hydroxyl group;
   b. 0-3% by weight of a cross-linking catalyst; and
   c. 30-60% by weight of an organic solvent.
2. The enamel according to claim 1, additionally comprising up to 65% by weight of a filler or pigment.
3. The enamel according to claim 1, additionally comprising up to 5% by weight of a dye.
4. The enamel according to claim 1, additionally comprising 0.1 to 3% by weight of an adjuvant selected from the group consisting of leveling agents, gloss improvers, antioxidants, and heat stabilizers.
5. The enamel according to claim 1, wherein the hydroxyl number of said polymer containing hydroxyl group is between 60 and 150 mg KOH/g.

* * * * *

UNITED STATES PATENT AND TRADEMARK OFFICE
CERTIFICATE OF CORRECTION

PATENT NO. : 4,430,474

DATED : February 7, 1984

INVENTOR(S) : Horst Schnurbusch et al

It is certified that error appears in the above-identified patent and that said Letters Patent is hereby corrected as shown below:

On the title page Items [75] and [73] should read:

- -[75]  Horst Schnurbusch, Herne; Rainer Gras, Bochum; Elmar Wolf, Recklinghausen; Josef Disteldorf; Werner Hubel, both of Herne, all of Fed. Rep. of Germany - -

- -[73]  Chemische Werke Huls AG, Marl, Fed. Rep. of Germany - -

Signed and Sealed this

Sixteenth Day of October 1984

[SEAL]

Attest:

GERALD J. MOSSINGHOFF

Attesting Officer

Commissioner of Patents and Trademarks